3,171,714
METHOD OF MAKING PLUTONIUM
OXIDE SPHERES
Lerroy V. Jones, Miamisburg, Donald Ofte, Kettering, and Philip A. Tucker and Layton J. Wittenberg, Dayton, Ohio, assignors to the United States of America as represented by the United States Atomic Energy Commission
Filed Oct. 5, 1962, Ser. No. 228,779
9 Claims. (Cl. 23—14.5)

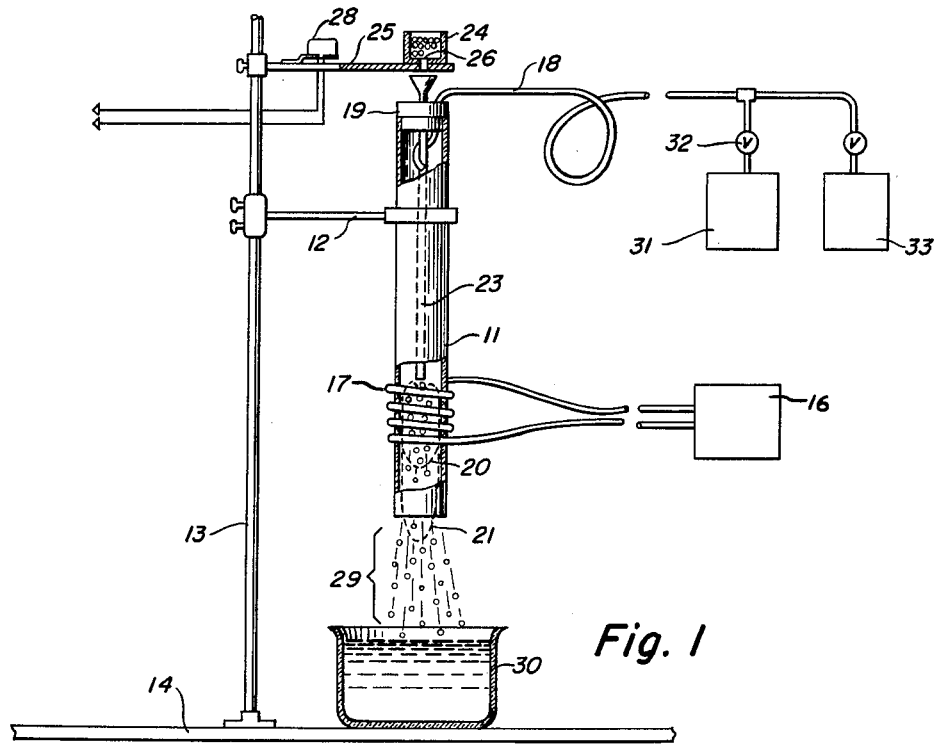
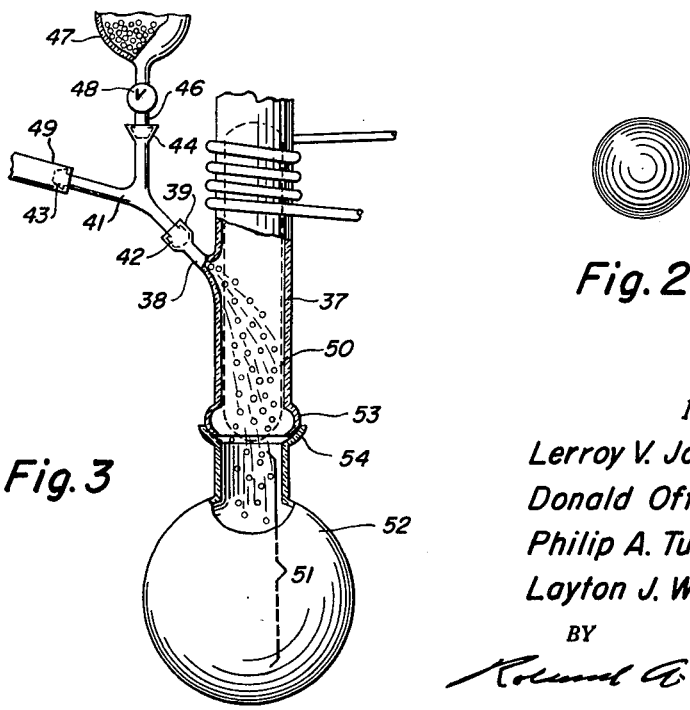
Fig. 1
Fig. 2
Fig. 3
INVENTORS:
Lerroy V. Jones
Donald Ofte
Philip A. Tucker
Layton J. Wittenberg
BY
*Attorney*

The present invention relates generally to radioactive plutonium oxide and more particularly to contamination-free plutonium oxide microspheres and the method of manufacture thereof.

Nuclear reactor fuels in ceramic form because of their in-pile dimensional stability at high temperatures and high burn up are of considerable interest. Thus, plutonium which possesses high neutron efficiency is accordingly being considered as a fuel for power reactors, particularly reactors of the fast breeder concept. Therefore, it is a principal object of the present invention to provide ceramic forms of plutonium oxides capable of reactor fuel and other applications which are free of the radiation hazards normally associated with the handling of plutonium that heretofore made the use of it unattractive.

Another object of the present invention is to provide a novel method of manufacturing plutonium oxide spheres that are thermally and chemically stable.

Another object of the present invention is to provide wipe-free plutonium oxide spheres of various desired sizes.

A further object of the present invention is to provide a spherical form of plutonium oxide admixed in parent glass or with minor portions of other appropriate oxides.

Other and further objects of the invention will be obvious upon an understanding of the embodiments about to be described, or will be indicated in the appended claims, and various advantages not referred to herein will occur to one skilled in the art upon employment of the invention in practice.

Preferred forms of apparatus for fabricating the plutonium spheres of the present invention have been chosen for purposes of illustration and description. The apparatus illustrated are not intended to be exhaustive nor to limit fabrication of the invention to the precise forms of apparatus disclosed. They are chosen and described in order to best explain the principles of the invention to thereby enable others skilled in the art to best utilize the invention in various embodiments and modifications as are best adapted to the particular use contemplated.

Plutonium oxides as used herein are intended to be descriptive of all forms of plutonium oxides.

In the accompanying drawing:

FIG. 1 is an elevational view, partly cut away, generally showing apparatus for fabricating plutonium oxide microspheres;

FIG. 2 is a view generally illustrating a plutonium oxide microsphere of the present invention; and FIG. 3 is an elevational view, partly cut away, generally showing another form of apparatus for fabricating plutonium oxide microspheres.

Described generally a preferred embodiment of the present invention comprises the manufacturing of plutonium oxide ($PuO_2$) microspheres by passing plutonium oxide particles through an extremely high temperature zone provided by an electrodeless induction plasma torch, which heats gases to very high temperatures, e.g., 14,000°–19,000° K. The plutonium oxide may be first prepared by grinding it into a powder form, pressing the powder into pellets and thereafter sintering the pellets in a relatively high temperature furnace or the like capable of attaining about 1500° C. Sintering the pellets increases their density and bonds the fine powder into a strong agglomerate which is necessary for introduction into a plasma torch. The sintered $PuO_2$ pellets may be ground into particles and then screened or segregated to provide desired mesh size and thereafter injected into the plasma torch where the $PuO_2$ is exposed to a high temperature plasma zone and heated above its melting point for effecting the substantially spherical shape.

Described more particularly and with reference to FIG. 1, the plasma torch may comprise a cylinder 11 of a suitable material, such as fuzed quartz or the like, which may be about 40 millimeters in diameter and of any suitable length. The cylinder 11 may be supported in an upright position by a movable clamping member 12 which may have one end thereof affixed about the cylinder 11 adjacent its upper end and be slidably attached by the other end to a rigid upright support rod 13. The clamping member may move along the rod 13 so as to vary the distance between the lower end of the cylinder 11 and the base structure 14 as will be brought out below.

A radio frequency (R.F.) generator generally indicated at 16 may be operatively associated with the cylinder 11 by providing a few turns, e.g., four or five, of a suitable induction coil 17 about the cylinder adjacent its lower end. This coil may comprise copper tubing through which cooling fluid is forcibly circulated. The generator 16 or R.F. heating unit may be a commercially available induction heater which is capable of providing an output of, for example, about 10 kilowatts at a frequency of about 4 megacycles. The energized R.F. coil 17 provides a R.F. field that "couples" the conductive gas passing through the tube to provide a "plasma" which, when using particular gases as will be brought out below, may attain temperatures ranging from about 14,000°–19,000° Kelvin. The gas, for example argon, may be introduced into the cylinder through its upper end by a conduit 18 at a rate of about 3 to 7 cubic feet per hour. The upper end of the cylinder 11 may be closed by a suitable sealing device such as a sealed metal end plate or plug 19, thus insuring that the introduced gas flows downwardly through the cylinder 11. It may be desirable to provide a swirling or eddying flow of gas through the cylinder so as to cool the cylinder walls and also for preventing the natural tendency of gas from sweeping the generated plasma from the cylinder.

In order to initiate operation a graphite rod or the like may be placed in the cylinder within the R.F. field. The rod becomes heated by the field and lowers the breakdown potential of the gas, thereby initiating the generation of the plasma which thereafter rapidly enlarges into a full plasma flow. The plasma itself forms a high temperature zone including a small oval shaped body of highly luminous ionized gas located generally radially inwardly from the R.F. coil as indicated by the dotted line 20. From the plasma body 20 a plasma "tail" as generally indicated by the dotted line 21 extends downwardly below the R.F. coil. In the body portion of the plasma the plutonium oxide may be preferably introduced by coaxially positioning a small quartz feed tube 23 in the cylinder 11. This tube 23 may extend from a point above the end closure 19 to adjacent the upper end of the plasma body 20. While large size plutonium oxide spheres are attained when the tube 23 is in the above position, spheres of smaller mesh sizes may be attained by injecting the plutonium oxide particles into the "tail" of the plasma at a point immediately below the R.F. coil (FIG. 3).

The plutonium oxide particles (the details of which will be set forth below) may be introduced into the feed tube 23 by employing a suitable supplying means outside the cylinder 11; for example, a small PuO₂ particle receptacle 24 secured to a relatively thin arm-like member 25 radially extending from and releasably attached to the support rod 13. The receptacle 24 may be provided with a small opening 26 therethrough which aligns with an opening through the arm member 25 for passing the particles from within the receptacle into the open end of the tube 23. To insure that the plutonium oxide particles dropping from the receptacle 24 enter the tube 23 it may be desirable to provide the tube with a flared end portion and position the tube opening fairly close to the opening through the arm member. To facilitate flow of the plutonium oxide particles at an even rate from the receptacle 24 into the plasma torch it may be desirable to provide the arm 25 with a simple oscillating means, such as the buzzer 28, to vibrate the receptacle 24. As illustrated in the drawing the plutonium oxide particles "free-fall" from the receptacle into the feeder tube 23; but, if desired, the receptacle may be sealed at its upper end and a small portion of the gas from conduit 18 coupled to the receptacle 24 to provide a means of propelling the plutonium oxide particles into the plasma. The gas within the tube 23 also provides a cooling feature for the latter.

As the plutonium oxide particles leave the tube 23 they are practically immediately and thoroughly heated to a temperature of about 2,500° C., which is greater than the melting point (2280±30° C.) of PuO₂, and assume substantially spherical shapes.

The newly formed PuO₂ spheres are white hot as they emerge from the plasma and rapidly lose their heat by radiation so that by the time they are about six inches below the plasma their temperature is normally less than 600° C. The microspheres may be captured and retained in a beaker 30 which may be separated from the plasma "tail" by a space or air zone 29 extending about twenty inches or any other suitable distance below the flame. The beaker 30 may be filled with water or another suitable liquid to catch the fine microspheres emerging from the plasma.

Since the PuO₂ prior to its introduction into the torch presents a health hazard it may be desirable to enclose the apparatus illustrated in FIGS. 1 and 3 in a box (not shown) made of a suitable material, such as Plexiglas.

In preparing the feed material, plutonium oxide may be first produced in powder form by a chemical process, such as by precipitating the plutonium from a nitrate solution as an oxalate in the form of a very fine powder. This powder may then be die pressed at a pressure of about 6000 p.s.i. by any suitable pressing means into small pellets which are thereafter sintered in a suitable furnace by exposing the pellets to a temperature of about 1475° C. for about 45 minutes. The sintered pellets may then be placed in a mortar such as a Plattner diamond mortar and ground into small particles. The PuO₂ particles may be classified or segregated by screening them into desired mesh fractions, for example, varying in size from a maximum of about 35 mesh (one-fiftieth of an inch) to a minimum of less than 400 mesh. After the particles are segregated they may be placed in a suitable receptacle and introduced into the plasma torch at a slow uniform rate of about one gram per minute for the larger mesh sizes to less than one gram per minute for the smaller mesh sizes.

PuO₂ particles varying from 35 to about 400 mesh are suitable for feeding through the apparatus shown in FIG. 1 to form PuO₂ microspheres ranging from about 15 to 250 microns in diameter.

When forming the spherical PuO₂ particles the tube 11 is preferably supplied with argon gas enriched by oxygen which prevents the particles from being reduced in the high temperature plasma and becoming oxygen deficient and thereby impairing their value for reactor fuel application as will be brought out below. Oxygen may be combined with the argon gas by employing any suitable arrangement; for example, a source of oxygen generally indicated at 31 in FIG. 1 may be coupled through a suitable valve 32 to the argon supplying conduit 18 which extends from a valve controlled argon source generally indicated at 33 to the torch.

Normally, it is desired to maintain an oxygen to plutonium ratio of about two-to-one throughout the thermal history of the product first as the powder, then as the sintered feed material and finally through the melting of the PuO₂ in the tube 11. This ratio is approximately stoichiometric and may be maintained by using 25 percent oxygen and 75 percent argon in the plasma torch. However, the exact ratio of oxygen to argon is not critical as long as there is sufficient oxygen present to prevent high temperature reduction. The plasma has been found to remain stable with up to 40 percent oxygen.

The microspheres possess a crystalline structure, as determined by X-ray diffraction analysis. The X-ray patterns reveal a face-centered cubic structure with cell dimensions calculated to be about 5.395±0.002 angstroms in size.

The hardness of the microspheres may be determined with a suitable device, such as a Vickers diamond, by making indentations on a flat polished surface of a microsphere embedded in plastic, cross-sectioned, and polished by ceramographic techniques. The maximum load employed for the indentation which did not result in a brittle fracture of the surface was 50 grams. A Vickers hardness was indicated of about 1163 kilograms per square millimeter or a Mohs hardness of between 7 and 8.

The oxygen content of the PuO₂ microspheres is preferably maintained at about the ratio of 2 to 1 as mentioned above, since oxygen deficient microspheres may be considered somewhat undesirable for use as fuel elements for any of several reasons; for example, the dimensional stability of the lower valent oxides (PuO and Pu₂O₃) is poor when the microspheres are cycled over a wide temperature range. Another dawback of oxygen deficient microspheres is based on crystallographic symmetry in that the higher symmetry of stoichiometric PuO₂ is more likely to result in better radiation stability than the expanded lattice of oxygen deficient microspheres. Of course, if the microspheres are to be used for other applications where the oxygen content is not as critical it will appear clear that the microspheres may be made oxygen deficient.

Plutonium oxide microspheres produced by practicing the present invention show a remarkable freedom from loose contamination. A standard alpha scintillation counter used to count the alpha emission of a number of individual PuO₂ microspheres gives a very high direct reading and yet when the microspheres are rolled on a standard alpha survey wipe no loose contamination is found. For example, a typical microsphere 0.189 millimeter in diameter gives a direct reading alpha emission of 368,000 counts per minute and when the alpha survey wipe is made on this sphere no loose alpha contamination is noted.

The microspheres are also chemically stable. A number of them were individually subjected to the following leach solutions: one normal HCl, one normal HNO₃, one normal NaOH, and water at 25° C. and 100° C. After four weeks a portion of each solution was removed and counted for alpha contamination. Since the count on each of these solutions was zero, no attack of the microspheres by the leaching solutions was indicated. The above tests, except for the water, were made even more severe by using six normal solutions. After seventeen days these leaching solutions were checked for alpha emission and were found to be contamination-free.

When producing the microspheres, not all particles passing through the plasma become substantially spherical and a minor portion or "tailings" of the initial batch of particles remain in somewhat their original shape. For example, when treating a batch of particles of about 200 mesh size better than 90 percent of the batch is formed into spheres. The "tailings" or the portion of the batch remaining in non-spherical form may be separated from the microspheres by placing the entire batch on a vibrating inclined plate which causes the microspheres to roll away and thus separate from the "tailings." These "tailings" may be recycled without changing the composition of the plutonium oxide. Likewise the fines from the classification or screening step may be added to a new batch of powder and reprocessed.

The apparatus illustrated in FIG. 3 may be preferred as the means for fabricating or forming very fine microspheres from particles less than 400 mesh. The plasma generating apparatus is constructed to function in a manner similar to the apparatus shown in FIG. 1 except for the arrangement of the particle feed system and the microsphere collecting flask. In order to provide the apparatus of FIG. 3 with a particle feed system capable of introducing or injecting the plutonium oxide particles into the "tail" of the plasma at a point immediately below the R.F. coils so as to prevent the fine particles from being blown back up the tube by the plasma, the quartz tube 37 may be provided with a small upwardly slanted conduit 38 having an enlarged distal end 39 and communicating with the interior of the tube. A Y-shaped side-arm 41 having a pair of tapered ends 42 and 43 and a flared end 44 may be attached to the conduit 38 by inserting the tapered end 42 into the enlarged conduit end 39. A suitably sized conduit 46 extending from a particle receptacle 47 and having a tapered distal end may be attached to the side-arm 41 by sliding the tapered end into the flared end 44 of the arm 41. The conduit 46 may be provided with a suitable valve 48 for regulating the flow of particles from the receptacle 47. The remaining tapered end 43 of the side-arm 41 may be inserted into a gas conduit 49 capable of controllably conveying therethrough a mixture of argon and oxygen. Thus when the plasma torch is started and functioning in a manner similar to the apparatus of FIG. 1, the valve 48 may be opened to allow the plutonium oxide particles to drop from the receptacle into the path of the gas emerging from conduit 49 which conveys the particles through the conduit 38 and subsequentially injects them into the plasma where they pass through the plasma flame generally indicated by the dotted line 50 to form the fine microspheres which may be less than ten microns in diameter.

When the microspheres are formed they drop or pass from the torch through an air zone generally indicated at 51 and into a receiving or collecting flask 52. To insure that all the very fine microspheres are collected in the flask, it may be desirable to place the neck portion of the flask adjacent to or in an abutting relationship with the lower end of the quartz tube 37. To provide a suitable joint between the flask and the tube end it may be desirable to provide a ball joint therebetween which may comprise a bulb shaped enlargement 53 on the tube end adapted to fit within a flared distal end 54 of the flask neck.

While the structure in FIG. 3 is shown without support means, gas supply means, R.F. generating means, and a receptacle vibrating means it will appear clear that such means may be readily provided and be similar in construction and function to the support means, gas supply means, R.F. generating means and the receptacle vibrating means respectively, as illustrated in FIG. 1.

While the preferred microspheres comprise plutonium oxides alone, it has been found that plutonium oxide admixed in a parent glass may be formed into spheres. This plutonium-bearing glass may be prepared for treatment by grinding or crushing silicate glass to less than 100 mesh and then adding to a weighed amount of the ground glass a weighed amount of plutonium oxide powder which may be formed in a manner similar to plutonium oxide powder mentioned above. After thoroughly mixing the glass and the plutonium oxide the mixture may be transferred to a suitable crucible, such as a platinum crucible, and heated to about 1650°–1700° C. by an induction heater or the like to melt the mixture. The crucible may be inverted or agitated in a suitable manner to thoroughly mix the glass and plutonium oxide which subsequently becomes homogeneous as the plutonium oxide dissolves. The crucible and its contents may then be inverted to permit the plutonium oxide-bearing glass to flow out. A suitable plutonium-bearing glass which may be used for reactor fuel applications has about 10 weight percent of plutonium; however, other weight percents of plutonium may be used depending, of course, upon the particular fuel the reactor designer has in mind when designing the reactor.

The plutonium oxide-bearing glass as formed above may be initially finely ground in a suitable mortar for about 10 minutes and then added to water and filtered to remove particles in the colloidal range. The plutonium-bearing glass may then be washed in alcohol, dried and thereafter screened through a 200 mesh, with the particles of less than 200 mesh being subsequentially introduced into the tube 11 in a manner similar to that previously described. Plutonium oxide-bearing glass microspheres less than 20 microns in diameter are conveniently formed by this process; however, microspheres as small as 12 microns in diameter and as large as about 250 microns in diameter have also been prepared; of course, the larger microspheres require particles somewhat larger than the 200 mesh size above mentioned.

The preparation of the plutonium oxide-glass microspheres in the plasma torch does not necessarily require an oxygen enrichment since the oxide portion of the glass remains sufficiently high to ensure that the resulting microspheres are not oxygen deficient. Each of these microspheres normally contains microvoids which are formed when the temperatures of the glass become sufficiently high to vaporize the lower boiling components of the glass; however, it is possible to increase the concentration of the higher boiling components by successive passes through the flame. These microspheres like the $PuO_2$ microspheres of the preferred form are contamination-free, vitreous, have a density of about 2.5 grams per cubic centimeter and are chemically stable.

In some instances it may be desirable to fabricate the microspheres by combining the plutonium oxide in a solid state solution with other appropriate oxides, such as, for example, $UO_2$, $ZrO_2$ or $Y_2O_3$. These other oxides should comprise only a relatively minor portion of the solution; for example, such a solution may contain 10 to 20 weight percent $UO_2$ and 90 to 80 weight percent $PuO_2$, respectively.

It will be seen that the present invention sets forth a new form of plutonium oxide which may be used as a reactor fuel or otherwise, such as, for example, a source of alpha emission. These spheres show remarkable freedom from loose contamination which permits them to be handled safely not only in an open fume hood but even on a table in an open room instead of the tightly sealed alpha box closures heretofore relied on. Protective devices such as respirators, which normally must be employed in any handling of plutonium, have likewise proved to be an unnecessary precaution.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

We claim:
1. The method of making substantially contamination-free spheres of essentially plutonium oxide which comprises the steps of forming particles of essentially plu- tonium oxide, segregating particles of a preselected size range, and injecting the particles into a high temperature plasma torch zone to rapidly heat the particles to a temperature above their melting point, passing the resulting product through said zone and immediately thereafter through an air zone, and thereafter capturing and maintaining said product in the form of spheres.

2. The method claimed in claim 1 wherein the particles are injected into the high temperature plasma torch zone at a location adjacent a lowermost portion thereof.

3. The method claimed in claim 1 wherein the particles are injected into the plasma torch zone adjacent an uppermost portion thereof.

4. The method claimed in claim 1 wherein said product is captured and maintained in a receiving means having an upper end thereof disposed adjacent to said plasma torch zone and essentially encircling said air zone.

5. The method claimed in claim 1 together with the additional step of supplying oxygen to said zone to oxygenate the particles and product.

6. The method claimed in claim 5 wherein particles are injected at a rate of about one gram per minute, and wherein said oxygen is combined with argon gas and comprises about one fourth of the total quantity thereof.

7. The method claimed in claim 1 wherein the particles are initially formed as pellets which are thereafter ground into the particles, and wherein the pellets are sintered prior to the grinding step.

8. The method claimed in claim 1 wherein the segregating step provides a range of particles selected from a group of particles consisting of about 35 to less than 40 mesh in size, and wherein said plutonium oxide spheres range in size from about 10 to 250 microns in diameter.

9. The method claimed in claim 1 wherein said plutonium oxide is substantially homogeneously mixed in a parent glass.

References Cited by the Examiner
UNITED STATES PATENTS 3,002,808   10/61   La Mont _____ 23—14.5
3,070,420   12/62   White et al. _____ 23—14.5

OTHER REFERENCES

AEC Document MLM-1110, page 21, issued May 10, 1961.

AEC Document MLM-1126, pages 25–27, issued August 1, 1962.

AEC Document MLM-1129, page 31, January 21, 1962.

REUBEN EPSTEIN, *Acting Primary Examiner.*

CARL D. QUARFORTH, *Examiner.*